United States Patent [19]

Forrester

[11] Patent Number: 4,955,519
[45] Date of Patent: Sep. 11, 1990

[54] SKI CASE SLED

[76] Inventor: Keith E. Forrester, 38 Brookside Dr., Stratham, N.H. 03885

[21] Appl. No.: 328,242

[22] Filed: Mar. 24, 1989

[51] Int. Cl.$^5$ .............................................. B60R 9/04
[52] U.S. Cl. .................... 224/319; 224/315; 224/917; 224/316; 224/324; 224/42.01; 280/814; 296/37.7
[58] Field of Search ............ 224/917, 901, 922, 42.01, 224/309, 310, 315, 316, 319, 324, 325, 326, 328, 202, 257; 296/37.7; 280/814, 816, 815, 18, 20

[56] References Cited

U.S. PATENT DOCUMENTS

| | | | |
|---|---|---|---|
| 3,767,036 | 10/1973 | McLeod | 280/814 X |
| 3,915,362 | 10/1975 | Hart | 224/328 |
| 4,084,735 | 4/1978 | Kappas | 224/328 |
| 4,126,254 | 11/1978 | Sahakian | 280/814 X |
| 4,161,268 | 7/1979 | Heil | 224/917 X |
| 4,225,069 | 9/1980 | Breitschwerdt et al. | 224/328 |
| 4,238,063 | 12/1980 | O'Dair | 224/328 X |
| 4,720,031 | 1/1988 | Zimmerman | 224/323 |

FOREIGN PATENT DOCUMENTS

| | | | |
|---|---|---|---|
| 1116141 | 1/1982 | Canada | 224/917 |
| 2810912 | 9/1979 | Fed. Rep. of Germany | 224/319 |
| 3017266 | 11/1981 | Fed. Rep. of Germany | 224/917 |
| 2467738 | 5/1981 | France | 224/319 |
| 2518470 | 6/1983 | France | 224/319 |
| 2521931 | 8/1983 | France | 224/917 |

Primary Examiner—Ernest G. Cusick

[57] ABSTRACT

The ski case is a slim depth rectangular container designed to store, transport, and act as an overall ski equipment handling device. The case has two relatively asymmetrical major components—the top being the closure component of a ski equipment storage device as well as a sled to enable the transport of skis, boots, poles, and other miscellaneous ski-related material from the vehicle parking lot to the base lodge or elsewhere without the inconvenience and difficulty associated with carrying such items on one's person. The lower half of the case acts as the support and pivot for the top half as well as the mechanism for carrying the ski case on a motor vehicle roof or trunk. The lower half has a quick disconnect male-female dovetail system for easy and rapid removal from the auto roof top. The two components are lined with a velcro attached foam rubber which acts as the frictional support and restraint of the ski case contents. Given that the foam insert is pliable and removable, the ski case acts as a storage for any other items restricted only by the inner dimensions of the ski case. The ski case male dovetail guide component has clamp or screw-on guides for connection to existing roof racks or directly to car roofs, trunks of vehicles and bumpers as well. Used as a sled, the container's bottom half now is inverted and flexible elastic built-in straps can be used as securing straps for materials to be carried on the sled such as ski boots, lunch coolers, coats, etc. Given the versatility of the box liner system, the ski case can easily carry snowboards (a newly found sport), cross country skis, small sleds, and snowshoes.

4 Claims, 8 Drawing Sheets

SKI CASE SLED

BACKGROUND OF THE INVENTION

Skiing in America as well as throughout the world is many times a family adventure. Given that this sport many times involves a variety of family members on any one ski trip, the handling, storage, and transport of the various equipment can pose some difficulty and inconvenience. Hence, it would be beneficial if a device were available to reduce the burdens imposed upon skiers when attempting to handle, store, and transport the various shaped objects involved in skiing, snowboarding, sledding, cross country skiing or simply snowshoeing and for transport from cars to lodge, home, airports, or other transport.

Others have considered the need for ease of vehicle transport of ski equipment by designing elongated ski cases directed at ski storage and roof top carrying. The Ski Case Sled is designed to carry a variety of objects, is only six inches in height to reduce pressure drag on top of cars, is designed as a sled, and has a quick connect-disconnect ability onto roof tops of automobiles or rack-top.

It is an object of the present invention to provide a novel and improved container for storing, carrying, and transporting ski equipment, snowboards, snowshoes, and related equipment or other materials.

It is another object of the present invention to provide a transport container for skis and other equipment which will enclose the equipment and skis and secure the equipment between two replaceable insert foam pads which would protect all components of the skis and other stored equipment.

One aspect of the present invention is a ski-equipment sled for transporting ski equipment and related ski trip materials from the automobile parking location to the base lodge where ski equipment is donned. The case is easily quick-released and slid off of the auto and thereafter pulled or carried over the shoulder by one person using the carrying/pulling strap which is part of the present invention. Quite usually the distance from auto parking to ski lodge is sufficient to make the sled use desirable and highly convenient.

A further aspect of the invention provides a lockable ski case and equipment container which can be used for storing and locking skis, poles, wallets, and other valuables at the base lodge and to conceal the nature of the case contents to deter theft based on the style or expense of ski equipment. The case is designed with a strap to allow for connection to ski lodge ski racks, trees, etc.

Still another aspect of the present invention provides for strapping down equipment upon the Ski Case Sled once the sled is slid off the fixed guides atop auto roof or as connected to existing roof racks to allow for ease of carrying sports related equipment. The strap-downs can also be used for converting the ski sled into a backpack or over-the-shoulder equipment and ski carrying case. The case also has a handle for one-handed carrying by ones' side if desired for transport as luggage in airports or otherwise.

Another aspect of the invention provides for a case design which minimizes the pressure drag of the case atop auto roof by allowing for inversion of skis and placement of poles underneath in order to maximize volume use. Also the female channels which support the case are designed to take up air space inside the case which then reduces further external pressure drag of the case and utilizes available air space inside the case in lieu of requiring external supports.

Another aspect of the invention provides a quick connect-disconnect and locking system for transport of the ski case atop auto roof or auto roof racks. Male dovetail guides are either screwed into auto roof, integral to roof strap system or fit onto existing roof racks. The lower section of the ski case has female slide channels that receive the male dovetail guides to secure the case onto the roof or roof racks. The male guides are fitted with spring-backed pressure bars which "snap-in" the case securely. Also the male guides have a solid bar at the right end and a "up or down" position locking bar at the left end which allows for securing the case onto the male guides. This quick connect and quick disconnect feature allows for rapid and easy removal of the ski sled from the auto roof and rapid "flip over" of the case to take advantage of the sled option and carrying straps built into the case. To accomplish these objectives, the ski and equipment case embodies two vacuum or injection formed components which are hinged together along the length of the rectangular case and constructed of high density polyethylene or other similar material. The case could be constructed of most any other structural material as well. To latch the two components together the plastic form has two hinges and an internal locking system. The latching system allows for closure upon case contents as well as securing the case contents. Two replaceable foam rubber inserts can be used to create friction upon materials placed inside the ski case. These foam inserts would be replaceable over time given that ski edges and other sharp objects would tend to tear and cut the rubber pads over prolonged use.

The vacuum forms have Velcro attached foam rubber pad inserts that act as the frictional restraints to ski case contents. Given that the pads are not specifically constructed to support skis, the case is not limited to skis and/or poles. Accordingly, the case can be used for any variety of material storage and is limited only by the internal dimensions of the container. The objectives of this invention will become for defined upon presentation of the detailed description.

BRIEF DESCRIPTION OF DRAWINGS

FIG. 1 also shows the male guides as connected to a typical roof rack system.

Figure 4:
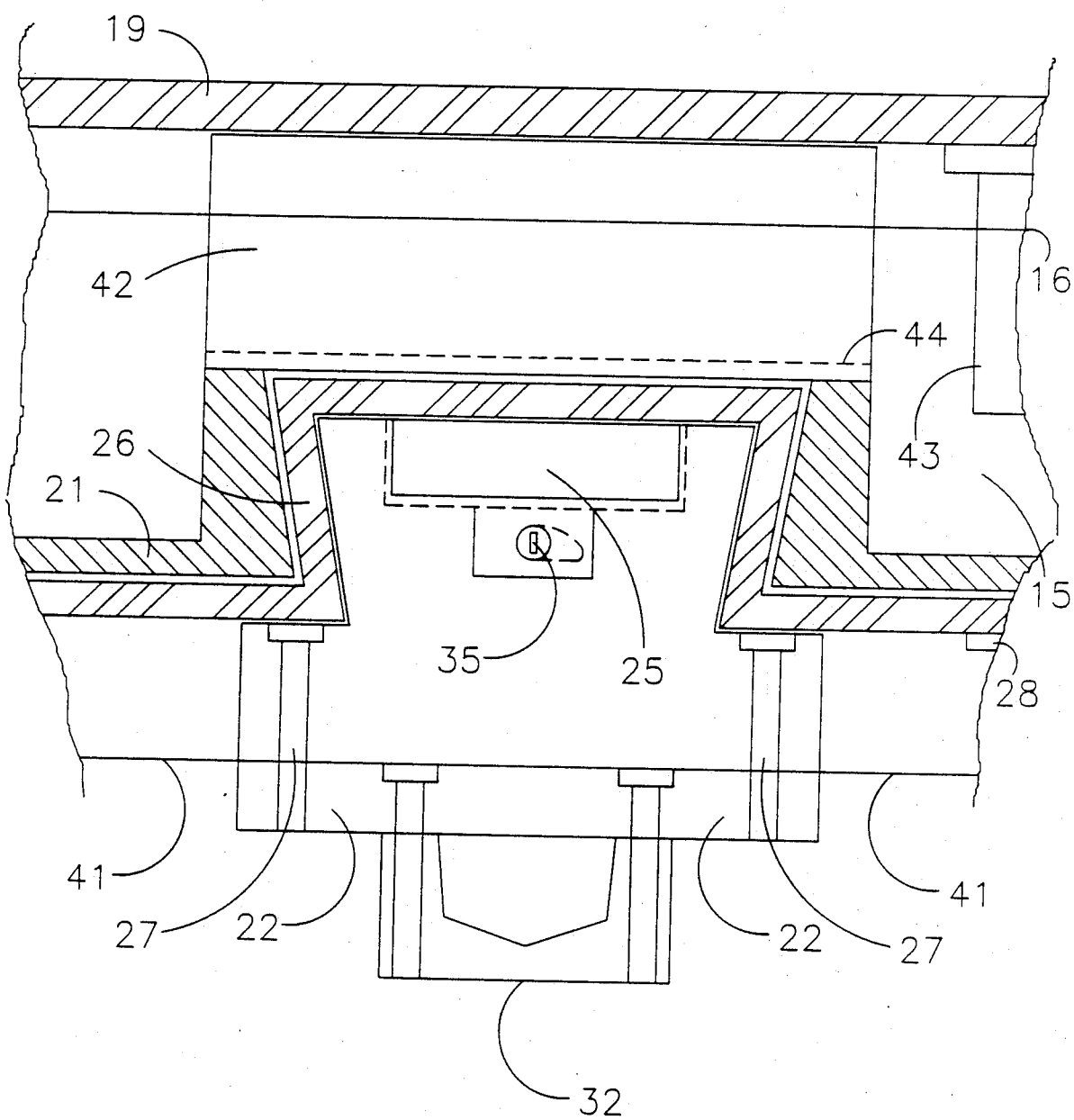

The male guide and the female channel are more closely shown in the crosssection detailing of FIG. 4 along with the ski velcro fastened pads, support, pole insert and web thickness of the formed case.

Figure 5:
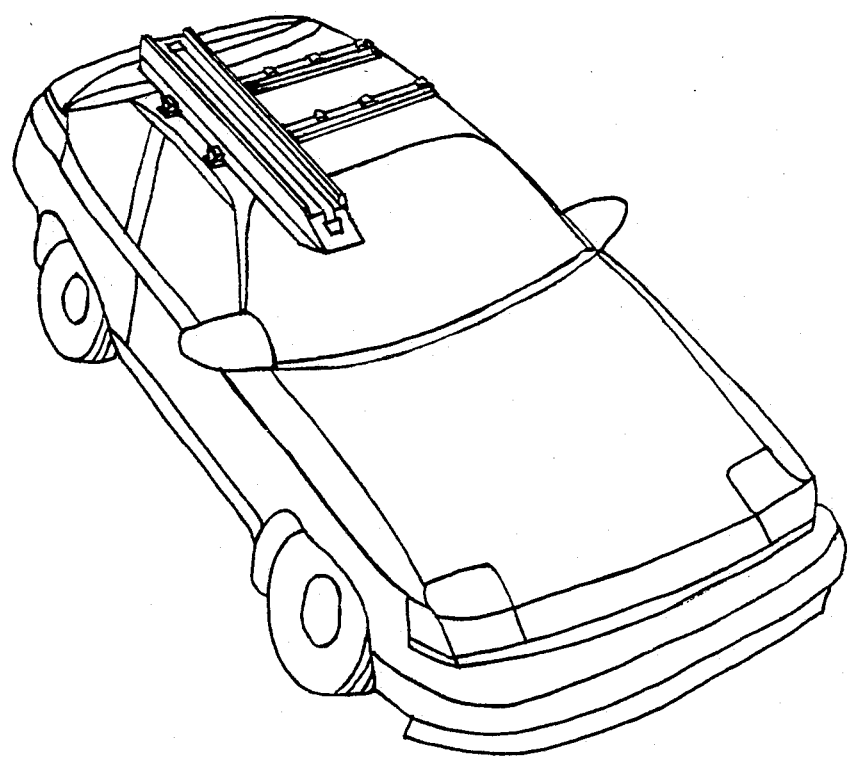

FIG. 5 shows the case atop an auto.

Figure 6:
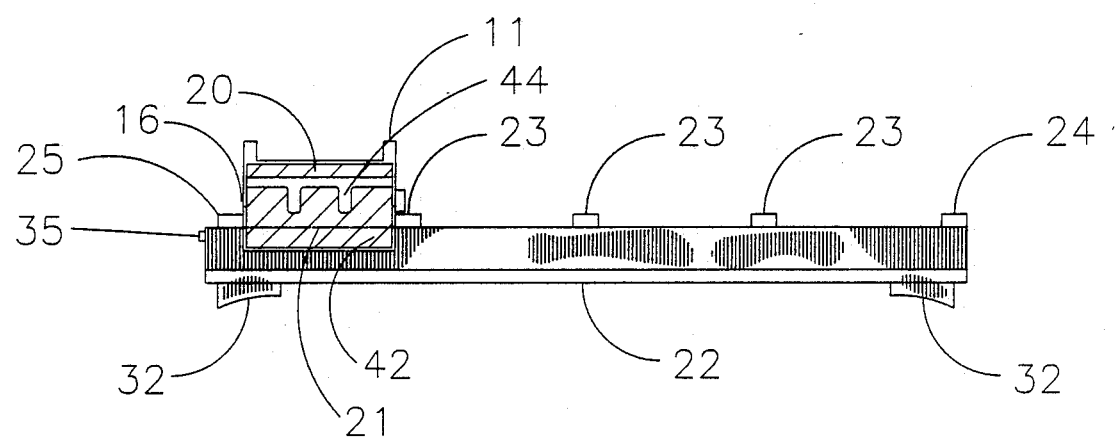

FIG. 6 shows a cross-section of the case detailing the foam inserts.

Figure 7:
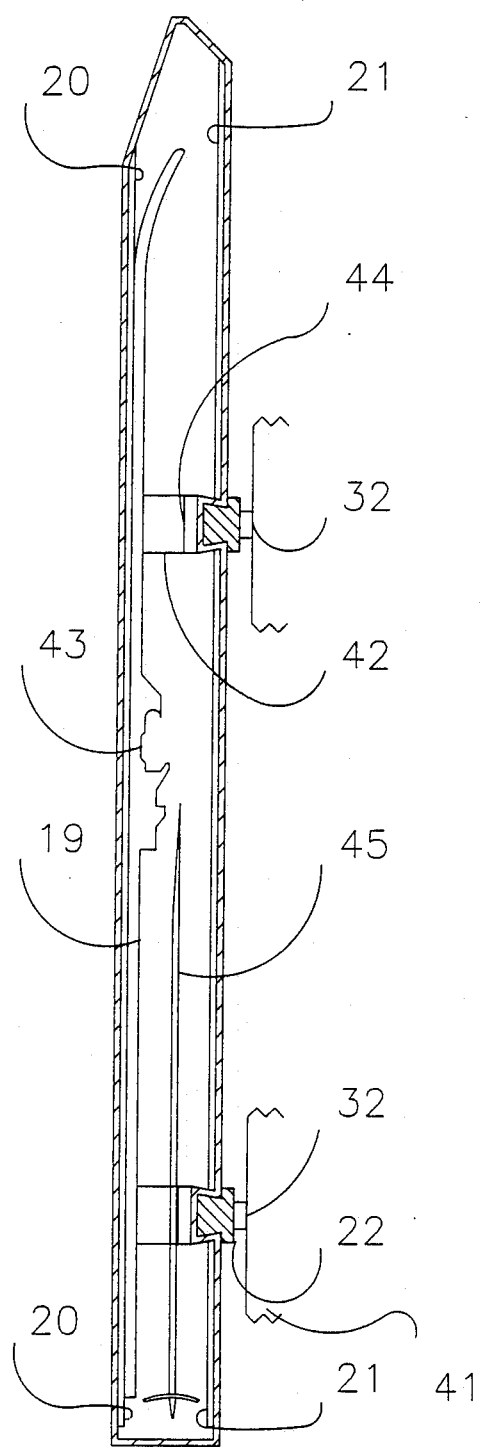

FIG. 7 shows a profile view of the case along its longest axis and reveals the fastening of poles and the ski support system.

Figure 8:
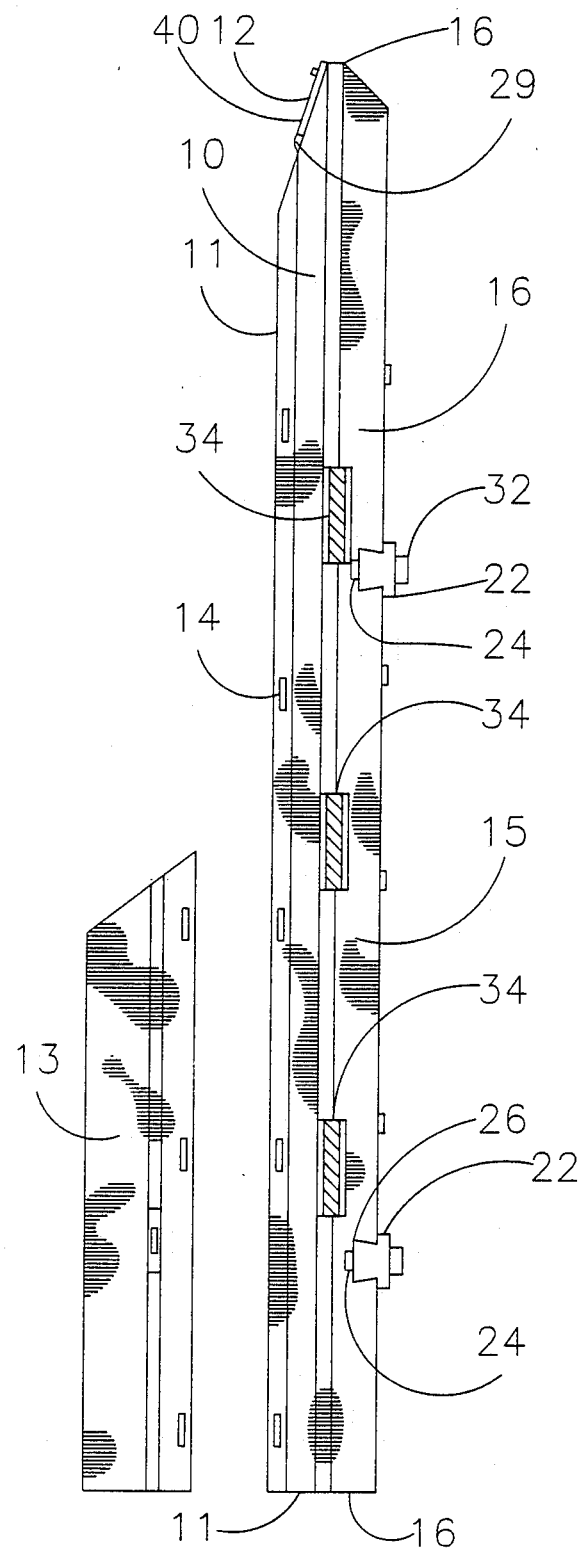

FIG. 8 reveals the optional boot case attachment atop the ski case.

DETAILED DESCRIPTION OF INVENTION

Figure 1:
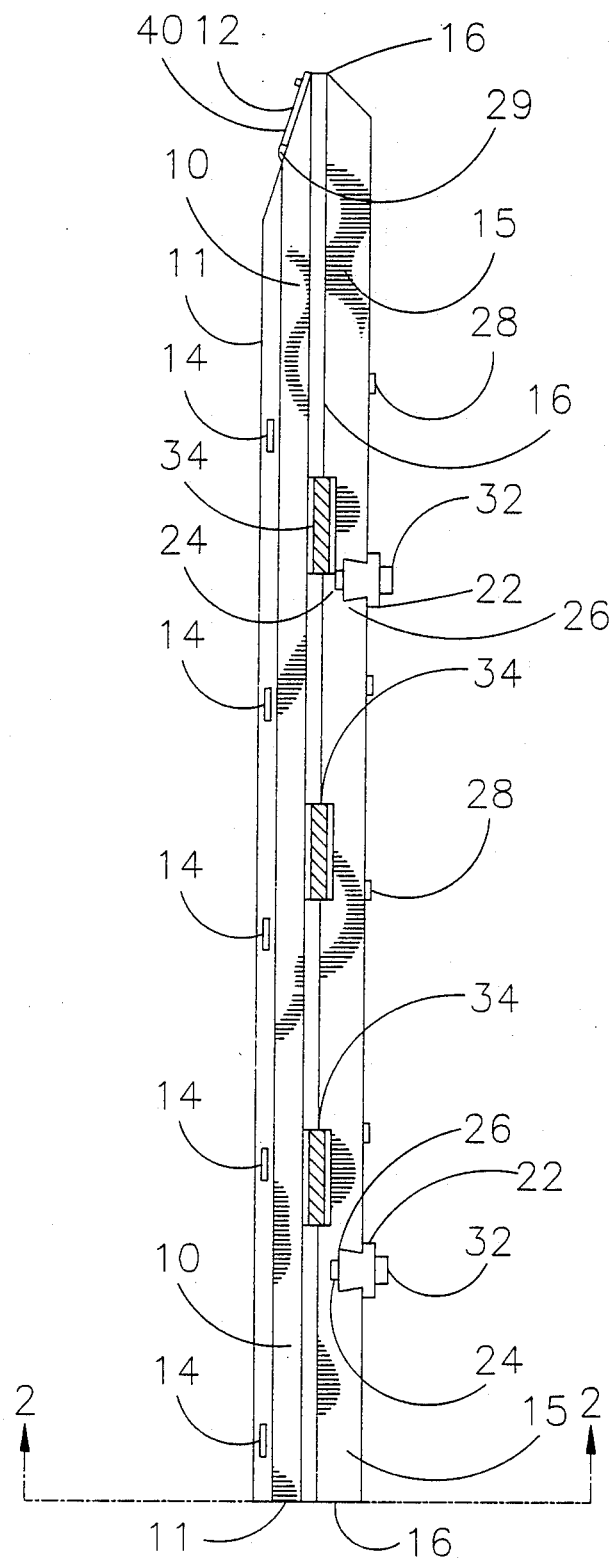
FIG. 1 is a side view of the ski case.

The preferred embodiment of the present invention defines the ski and boot case containers both having elongated rectangular vacuum-formed HDPE halves hinged together to form an enclosure for ski equipment or other materials as restricted only by the inner dimension of the case. The side view of the ski case shown in FIG. 1 shows the top section of the case 10 which is sloped at one end where the pulling strap connects at 40 and has integrally formed solid sled runners as shown by 11. In order, to pull the sled, one would snap the handle 12 into the clip 40 and pull-on strap or strap assembly 29 using handle 31.

Figure 2:
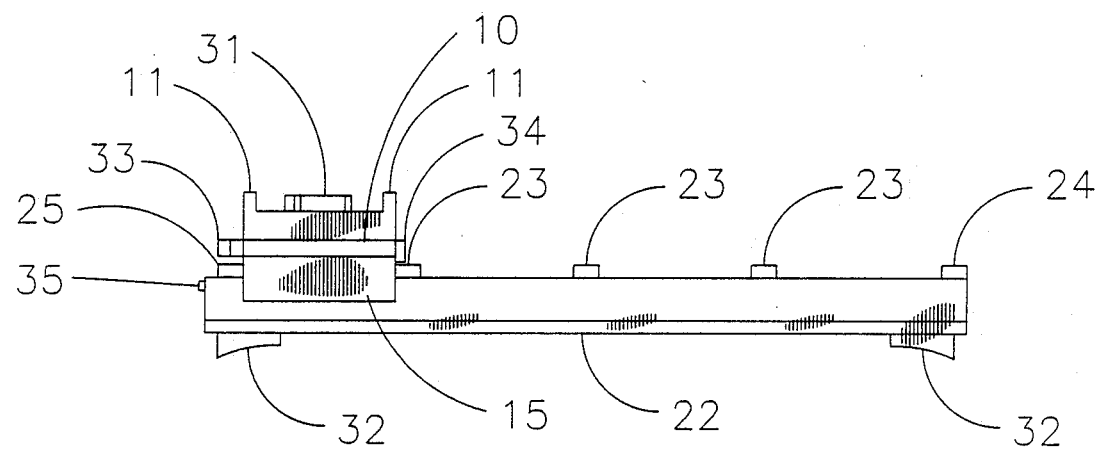
FIG. 2 shows the rear view of the case and side view of the male dovetail guide and roof supports.
Figure 3:
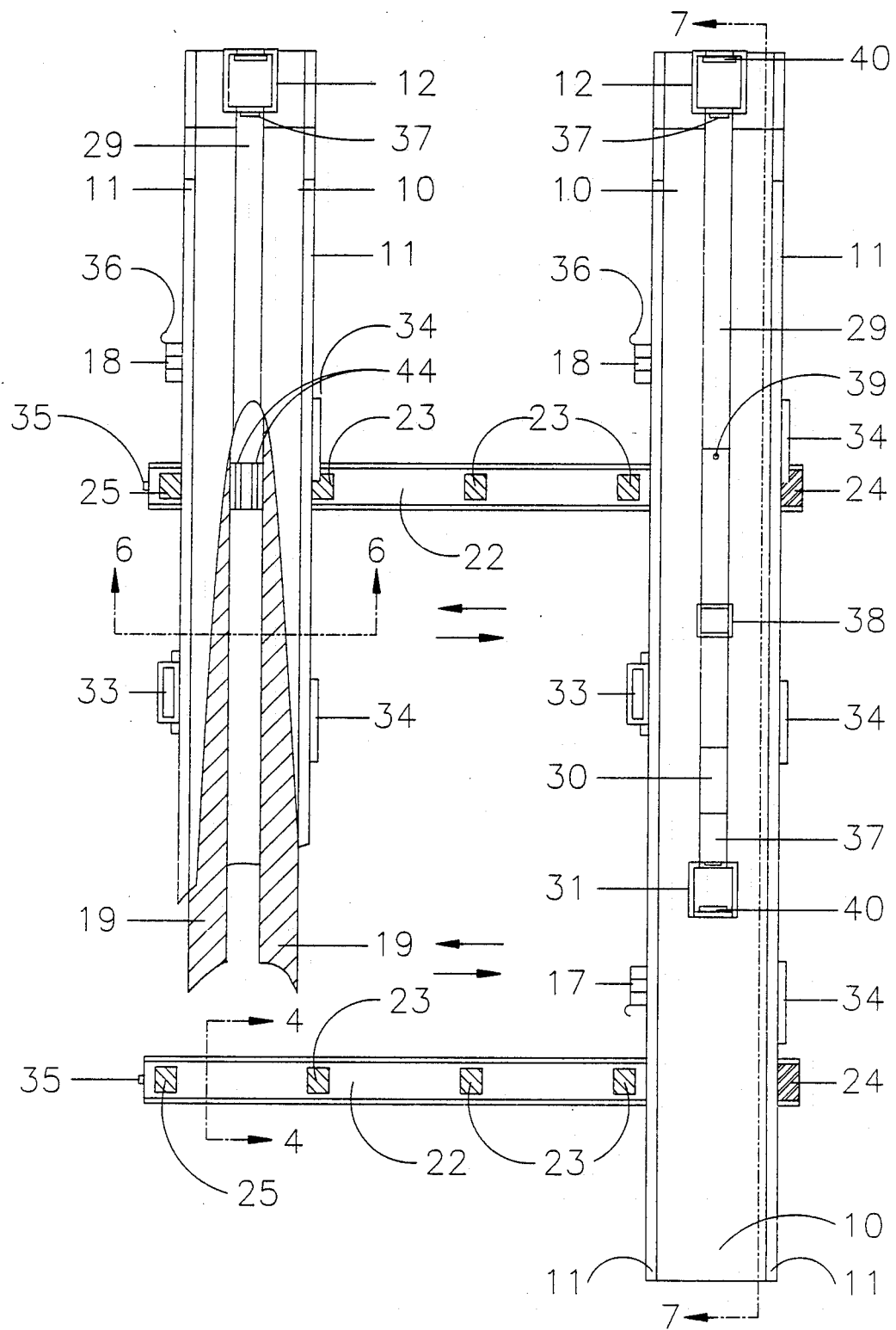
FIG. 3 shows the top view of the case set to the permanent end of the male guide and a cut-away view of the case showing location of poles and skis.

The ski case lockable handle 33 shown in FIGS. 2 & 3 allows for centroid carrying of the case such like a briefcase. The boot case 13 shown in FIG. 8 would normally remain detached from the slots 14 unless chosen by the operator.

The top of the case 10 hinges at 34 with the HDPE lower unit 15. The top 10 and bottom 15 meet with an identical perimeter geometric neoprene seal backed by the formed HDPE wall which is wide tongue and groove cut. The seat groove of the lower unit 15 meets with the upper unit 10 at horizontal reference axis 16. The two units 10 and 15 are closed upon each other and fastened by locks 17 and 18. As shown in FIG. 3, locks 17 and 18 have adjacent clips 36 to allow the adjustable strap 29, to be used as the over-the-shoulder strap for carrying the ski case. Swivels 37 on strap assembly 29 aid in this option keeping the strap 29 flush to one's shoulder. The handles 12 and 31 can be unclipped from storage clips 40 and reclipped for over the shoulder use into the clip openings 36. The strap assembly 29 is reset to the proper storage or auto top transport by adjusting the slide clip 38 to fasten a male-female snap at 39. The two locks 17 and 18 are either separate bolted-in-place or vacuum-formed of HDPE with some elasticity to allow clips to be flexible enough to open and close under adverse weather conditions. The strap 29 has a built-in elastic section 30 to assist in securing the strap 29 and handles 12 and 31 snugly into the storage clips 40.

The ski case allows for transport of skis 19 shown in FIG. 3 and ski poles 45 underneath the skis as set by the foam insert and support 42 shown in FIG. 4. The skis rest atop the foam insert 42 and poles are slid into the cuts 44. The insert support 42 is deep enough to assure that typical ski bindings 43 and ski brakes are not put under pressure upon closure of the ski case. The support inserts 42 are velcro fastened to allow for removal or replacement. The support 42 also allows for securing of the poles 45 in cuts/guides 44. The depth of the cuts 44 also assure that the ski pole 45 baskets are set to the far end of the case away from skis 19 to allow for no disturbance between baskets and skis fitting into the ski case. The top inserts of foam 20 and the bottom foam insert 21 allows for protection of ski edges and applies pressure at slight compression by 20 and provides protection from tip damage or other case content damage by 21.

The design of supporting the skis with the bindings 43 facing down and placed lengthwise between the two ski supports 42 as shown in FIG. 7 and having supports 42 designed to allow placement of poles in section 44, allows the overall pressure face of the case to be minimized and hence reduces pressure drag atop auto carrying racks. The tapered front of the case which supports handle 12 assists in the case as a sled in deep snow and also reduces eddy current formation and best forms a laminar flow pattern over the remaining case which hence reduces skin friction drag.

It should be understood that the ski case would be constructed in several widths in order to place more than one pair of skis in the case. This expands the function of the ski sled option and attracts the family market which may wish to have only one sled case for two or three pairs of skis or two sleds each having two pairs of skis. The primary ski case market is expected to be the single pair case given the many individual skiers and a desire to have a case which is storable and transportable in a small space while protecting the case contents from damage at airports, ski lodges, summer storage, etc.

Another aspect of the ski case is the rapid-connect, rapid-disconnect capability provided by the female channel-and-male dovetail-guide system shown in cross-section detail in FIG. 4. Also the channel-and-guide system allows for overhead or vertically stacking capability of the ski cases by manufacturers, retailers, and homeowners. The female channgel cut 26 in the bottom half of the case 15 will also greatly assist manufacturing processes by allowing a production line to have production line male guide 22 slides to move and hold the lower unit 15 while the upper unit 10 is fastened and velcro inserts 20 and 21 and ski and pole support 42 are inserted. The rapid connect and disconnect also allows for quick slide-off removal of the case from atop the auto and quick "flip over" for use of the sled runners 11 and pull strap 29.

Elastic straps 28 shown in FIG. 4 which are permanently fastened onto the lower unit 15 allow for equipment hold down when the case is used as a sled.

The male guide 22 in FIGS. 2 & 3 has three pressure bars 23 which are integral to the male guide and have compression pressure set by either internal springs or "u" shaped elastic HDPE or steel. The male guide 22 also has a permanent stop 24 at the right side of the guide and a left side locking up or down position bar 25 which is controlled through key lock 35 by the operator. When the ski case is to be slid off or slid on to the male guides 22, the operator would put bars 25 into the down mode by turning the key lock at 35 into a vertical position. The female channels 26 would then be pushed onto the male guide 22 until the single pair ski case abuts the first set of pressure bars 23. If the operator wishes to place more than one single pair ski case onto the male guide 22, a slight pressure on the first case would move it into the next section of the guide until abutting the next set of pressure bars 23. The pressure bars are of a width to assure that clips 17 and 18 and locking handle 33 are spaced at least 1/18" from the hinges 34 of the next case. The single case could be moved over to the permanent stops 24 to allow for three more single case inserts on the male guide 22. The wider family multiple-pair case would be slid on or slid off in the same fashion but would always keep one or two of the low pressure bars 23 in the compressed-down mode until the family ski case was removed from the male guide 22.

When the operator wishes to secure the ski case atop the male guides 22, the locking bar 25 would be placed in an "up mode" by turning the key at 35 to horizontal position. Since the male guide 22 dovetails into the female channel 26, and the male guide has one permanent stop 24 on the right side and a now "up mode" locked stop on the left side, the case is not removable by anyone other than the operator key holder. The case locking 33 secures the top section 10 to the lower section 15 hence securing any case contents while atop the male guide 22 or during transport via airports, etc. The male guide 22 would be either directly bolted/screwed into a separate roof carrier or auto roof 41 through screw set 27 or clamped and bolted to an existing roof carrier by bracket 32.

The ski case could be fastened to any object a separate cable and lock which could be stored in the case during transport and then removed by the operator and fed through handle 33 and around any available object much as a tree stand, etc., much like the approach with locking bikes to stands. The case offers a superior control here versus existing external ski locks given that the case will conceal the contents and hence would-be thieves have no visual ability to steal equipment based on its brand or style.

Although the present invention has been described with a certain degree of particularity, it is understood that the present disclosure has been made by way of example and that changes in details such as material construction, bracketing of the male dovetail guide to auto roof or other structure, locking mechanism on the case or the male guide, dimensions of the case or intent of case use as a sled may be made without departing from the spirit and scope as defined by the appended claims.

I claim:

1. In combination, a slim low-pressure drag container for transporting skis and ski poles or other materials in combination with at least one male dovetail guide of a roof-top of a vehicle, said container formed with at least one female channel to be connected to the at least one male dovetail guide; said at least one male dovetail guide and said at least one female channel being equal in number, said container comprising a top, a bottom, two side walls, and two end walls; said top including solid sled runners to allow the container to function as a sled; each said at least one male dovetail guide having (a) stop end bars cooperating with at least one of the at least one female channel to limit movement of the container when connected to the at least one male dovetail guide, (b) spacing bars, to securely retain the container on the at least one male dovetail guides, and (c) a locking bar, to lock the container to the at least one male dovetail guide; said end bars, said spacing bars and the locking bar, acting to secure the container onto a vehicle roof-top.

2. The combination of claim 1, including inserts in the container to protect, support and hold skis and poles, from movement within the container, said inserts being removable for expanding the internal dimensions of the container.

3. The combination according to claim 1, including a sled capacity which is defined by the runners and including means to permit pulling of the container as a sled.

4. The combination according to claim 3, wherein said container includes a sloped face at one of said end walls to allow the container as a sled with the cooperation of said runners.

* * * * *